(12) United States Patent
Li

(10) Patent No.: US 7,116,480 B1
(45) Date of Patent: Oct. 3, 2006

(54) METHOD AND APPARATUS FOR OPTICAL SWITCHING

(75) Inventor: Wei-Zhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 558 days.

(21) Appl. No.: 10/075,657

(22) Filed: Feb. 12, 2002

(51) Int. Cl.
*G02B 5/30* (2006.01)

(52) U.S. Cl. ............... 359/495; 359/484; 359/496; 359/497; 385/39; 398/56; 398/57

(58) Field of Classification Search ............... 359/484, 359/495–497, 900; 385/11, 22, 27, 33, 47, 385/36, 39; 349/196; 398/55–57
See application file for complete search history.

(56) References Cited

U.S. PATENT DOCUMENTS

| | | | |
|---|---|---|---|
| 6,178,044 B1 * | 1/2001 | Li et al. ............... | 359/484 |
| 6,181,846 B1 * | 1/2001 | Pan ............... | 385/18 |
| 6,360,037 B1 * | 3/2002 | Riza ............... | 385/22 |
| 6,441,961 B1 * | 8/2002 | Hou et al. ............... | 359/497 |
| 6,587,266 B1 * | 7/2003 | Tai et al. ............... | 359/484 |
| 6,594,068 B1 * | 7/2003 | Sui ............... | 359/280 |
| 6,735,016 B1 * | 5/2004 | Mao et al. ............... | 359/484 |
| 2003/0026583 A1 * | 2/2003 | Hoyt et al. ............... | 385/140 |
| 2005/0174639 A1 * | 8/2005 | Zalevsky et al. ............... | 359/484 |

* cited by examiner

*Primary Examiner*—Mark A. Robinson
*Assistant Examiner*—Lee Fineman
(74) *Attorney, Agent, or Firm*—Fish & Richardson P.C.

(57) ABSTRACT

An optical switch includes a first port, a second port, a first component group, a second component group, and a switching component group. The switching component group includes a reflector, a polarization beam splitter coupled to the reflector, and a polarization switch coupled to the polarization beam splitter. The first component group is coupled between the first port and the reflector in the switch component group. The second component group is coupled between the second port and the polarization beam splitter in the switch component group.

24 Claims, 7 Drawing Sheets

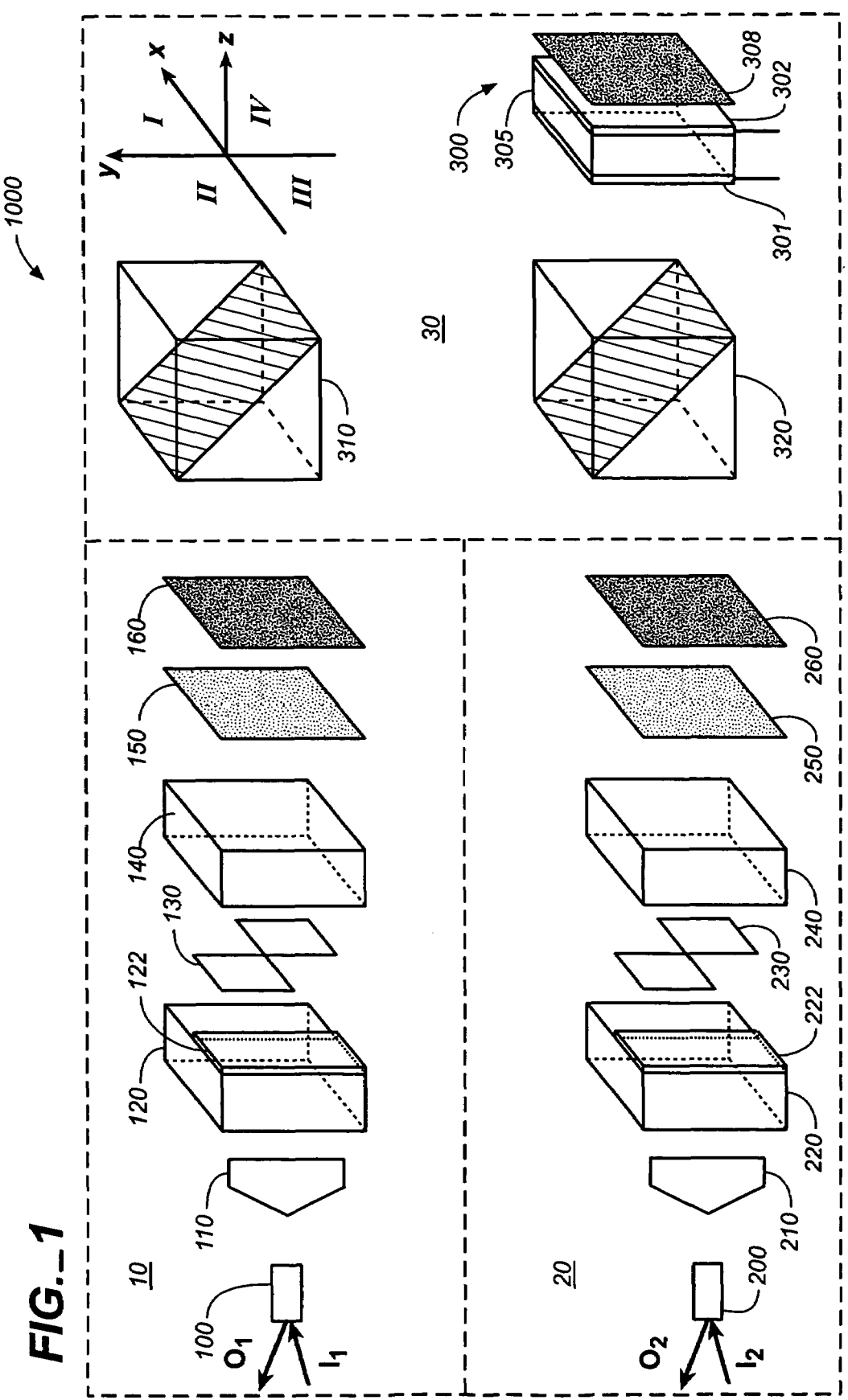
FIG._1

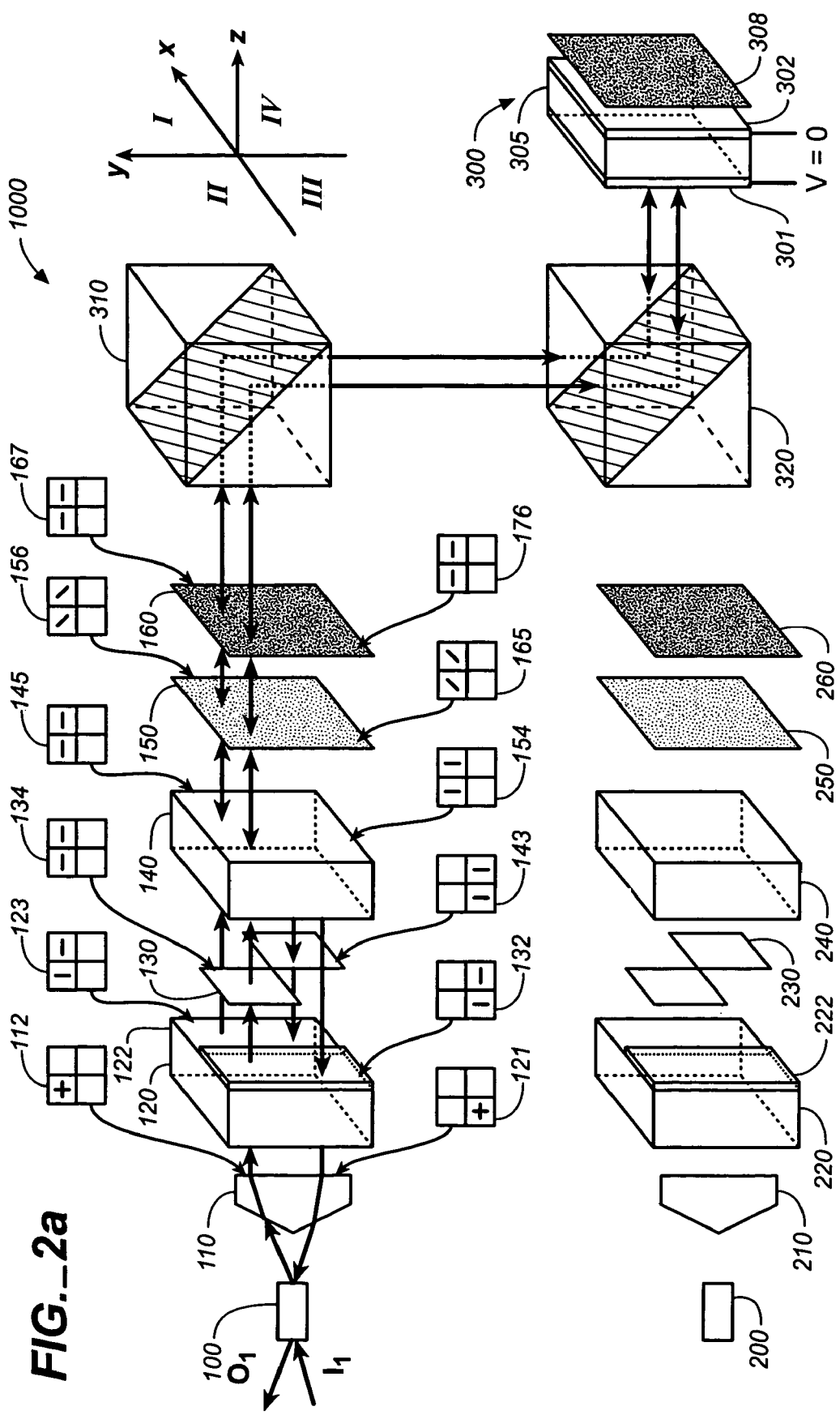
FIG._2a

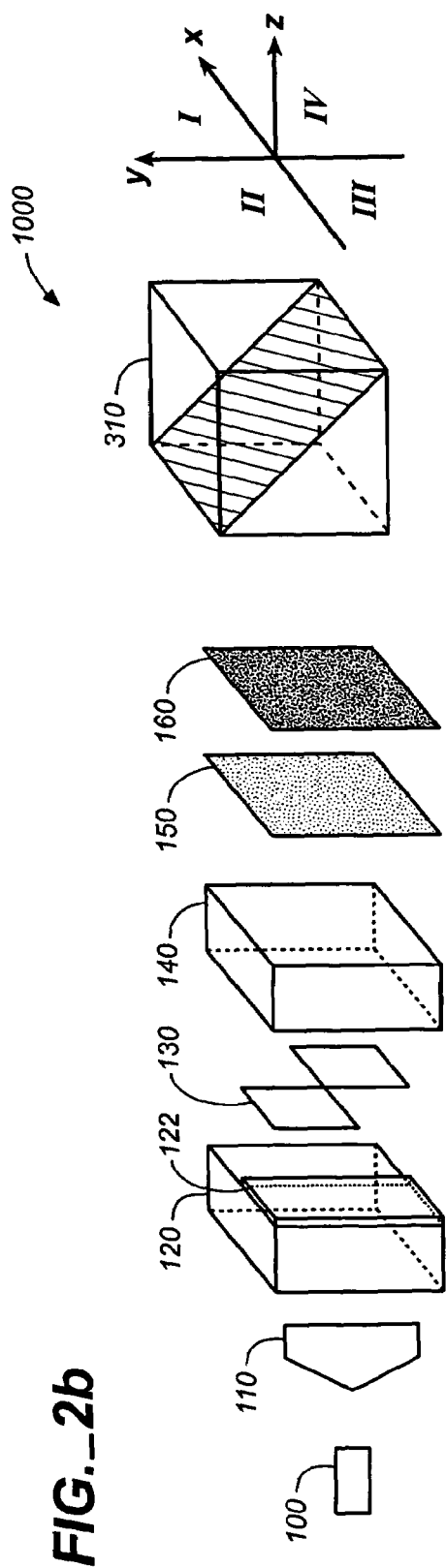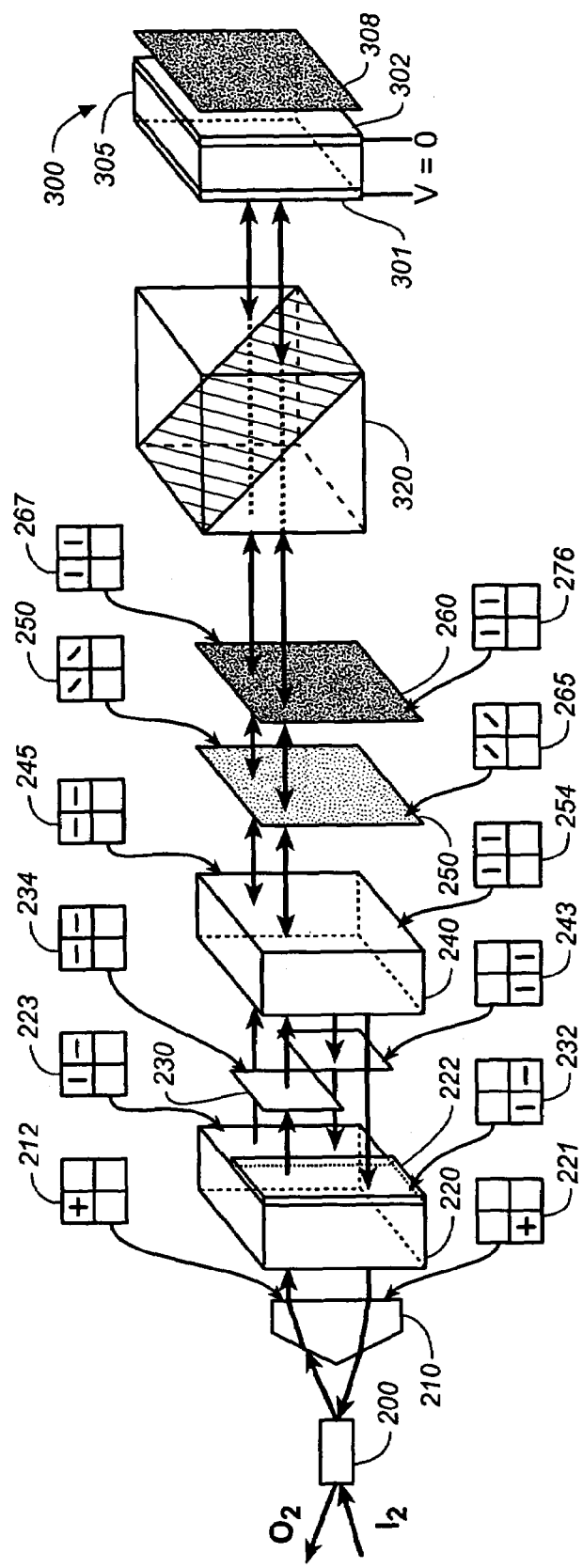
FIG._2b

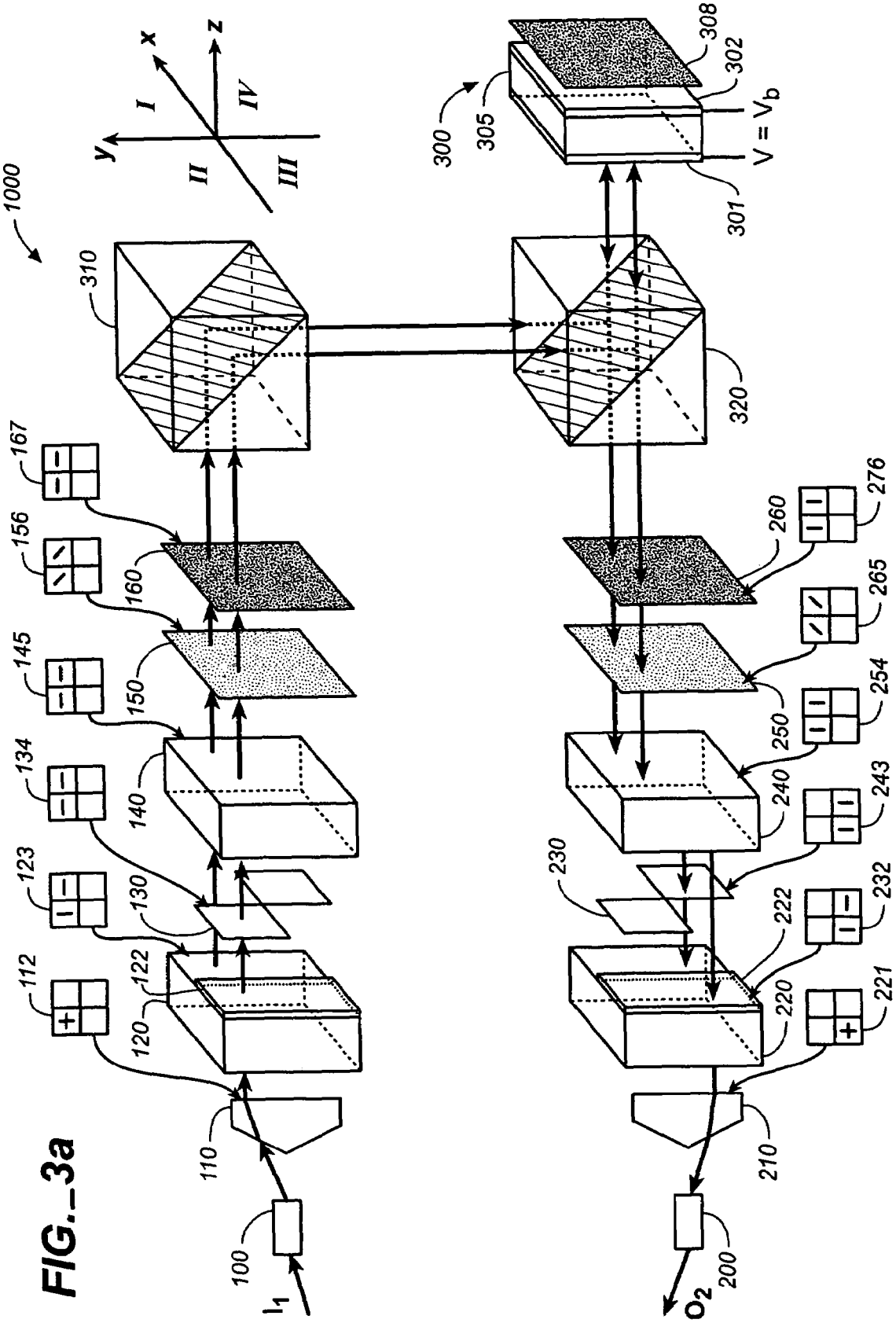
FIG._3a

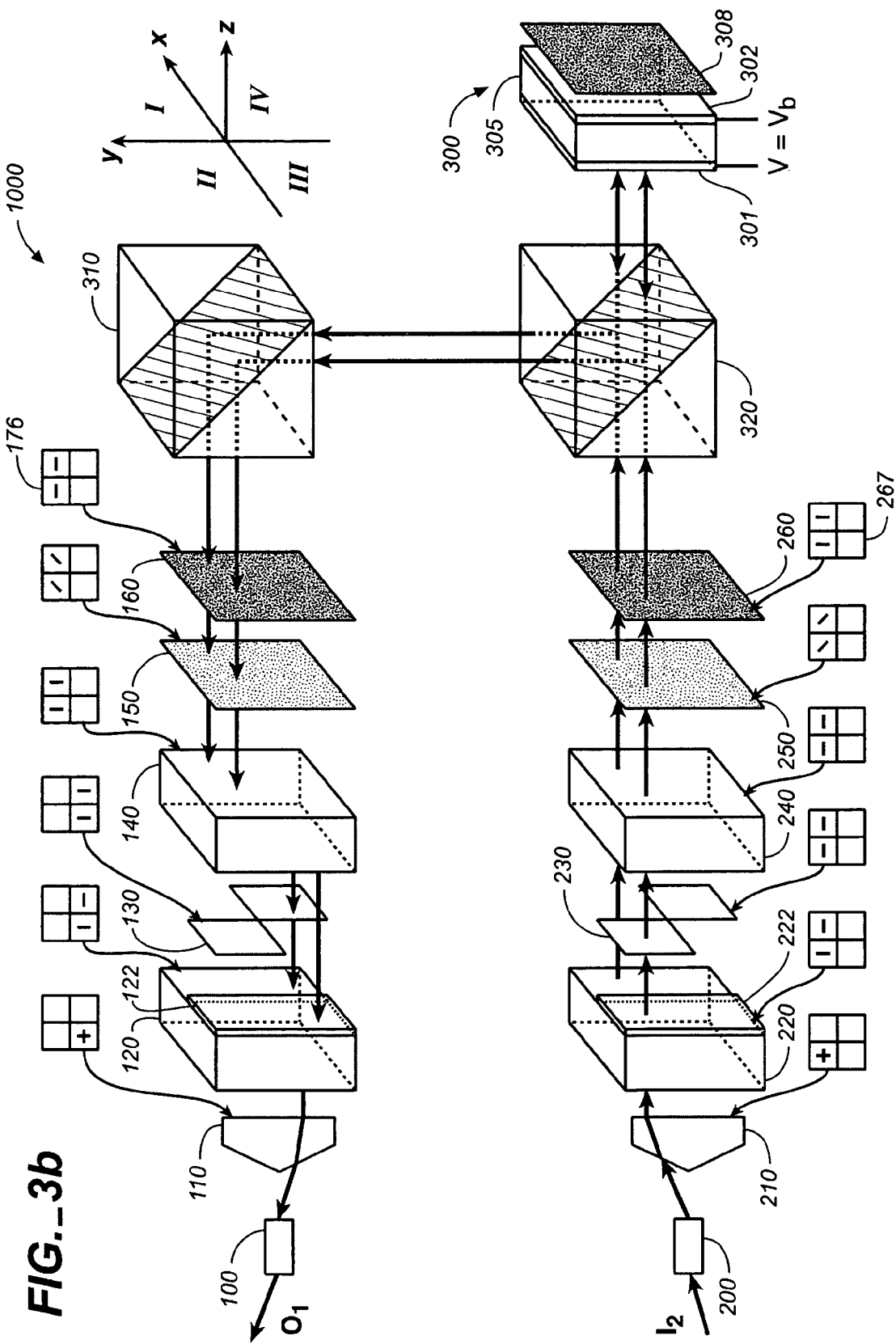
FIG._3b

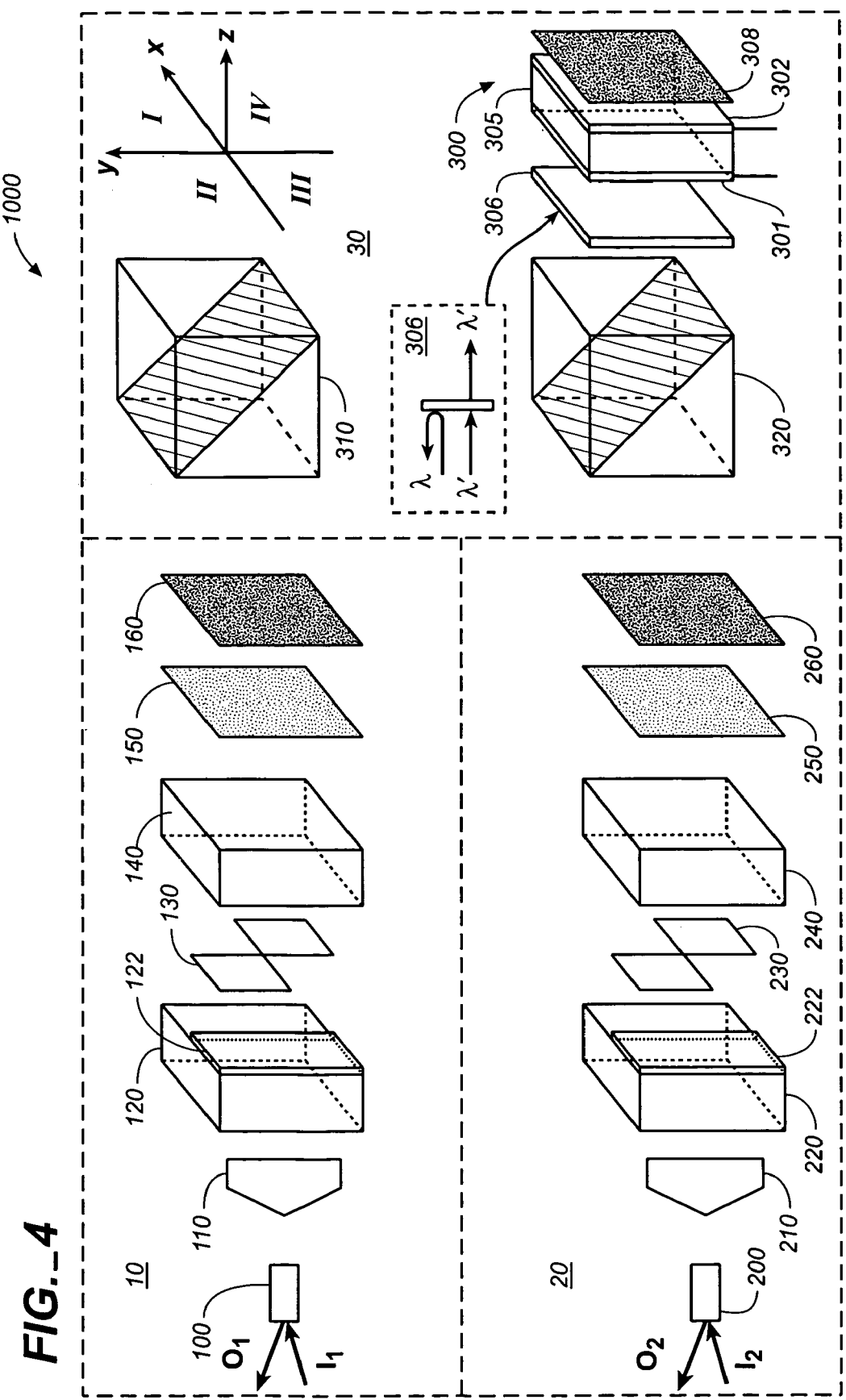
FIG._4

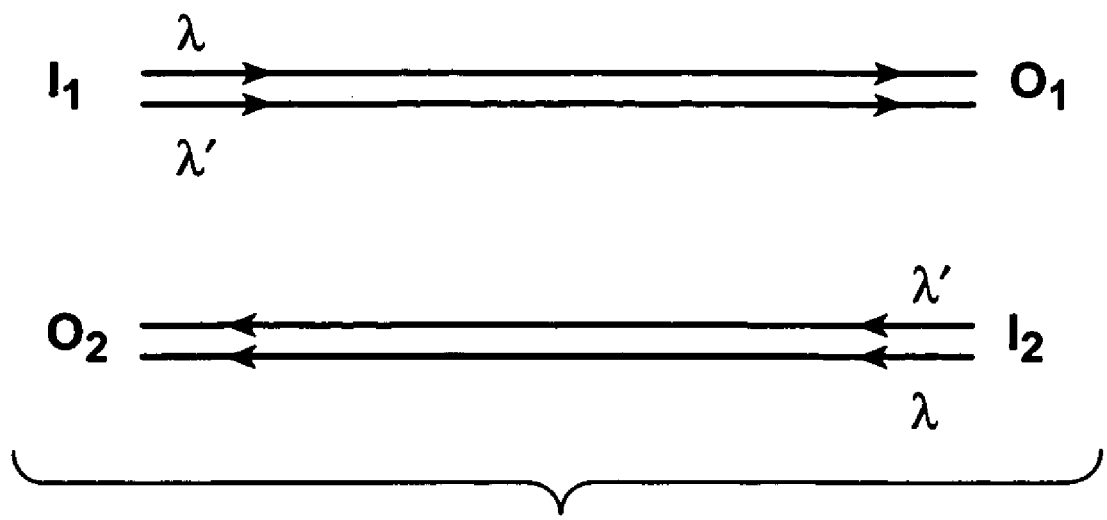
FIG._5a
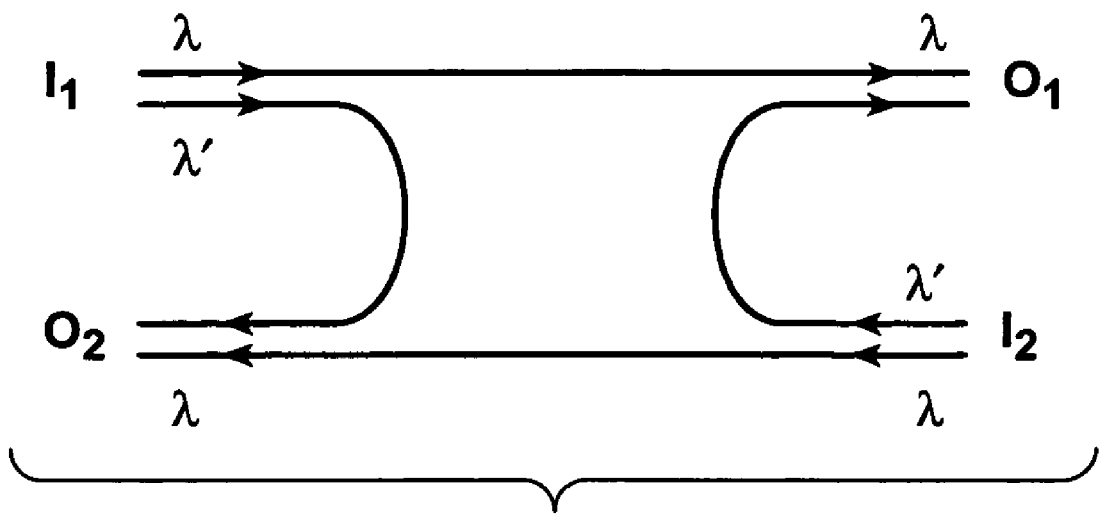
FIG._5b

METHOD AND APPARATUS FOR OPTICAL SWITCHING

The present invention relates generally to optical technology.

BACKGROUND OF THE INVENTION

A 2×2 optical switch is an optical component that provides switching between two input ports and output ports. Optical signals arriving at a given input port are transmitted to one of the output ports depending on the state of the optical switch. The 2×2 optical switch can be configured in one of two possible states as controlled by an external control signal. In a first state, an optical signal received from a first input optical fiber at a first input port is transmitted to a first output port that is in turn coupled to a first output optical fiber. In addition, an optical signal received from a second input optical fiber at the second input port is transmitted to a second output port that is in turn coupled to a second output optical fiber. In the second state, the optical signal provided from first input optical fiber is transmitted to the second output optical fiber, and the optical signal provided from the second input optical fiber is transmitted to the first output optical fiber. 2×2 optical switches are widely used in communications equipment and are required to be reliable, compact, and have robust performance across different operating conditions.

SUMMARY OF THE INVENTION

In one aspect, the invention provides an optical switch. A first port receives an optical input and generates an optical output. A second port receives an optical input and generates an optical output. A switching component group includes a polarization switch. A first component group is coupled between the first port and the switch component group. A second component group is coupled between the second port and the switch component group. When the polarization switch is disabled, the switch component group converts two light beams exiting from the first component group with a first chosen polarization into two light beams reentering the first component group with the first chosen polarization, and converts two light beams exiting from the second component group with a second chosen polarization into two light beams reentering the second component group with the second chosen polarization. When the polarization switch is enabled, the switch component group converts two light beams exiting from the first component group with the first chosen polarization into two light beams reentering the second component group with the second chosen polarization, and converts two light beams exiting from the second component group with the second chosen polarization into two light beams reentering the first component group with the first chosen polarization.

In another aspect, the invention provides an optical switch. A first port receives an optical input and generates an optical output. A second port receives an optical input and generates an optical output. A switching component group includes a reflector, a polarization beam splitter coupled to the reflector, and a polarization switch coupled to the polarization beam splitter. A first component group is coupled between the first port and the reflector in the switch component group. A second component group is coupled between the second port and the polarization beam splitter in the switch component group.

In another aspect, the invention provides an optical switch. A first port receives an optical input and generates an optical output. A second port receives an optical input and generates an optical output. A switching component group includes a reflector, a polarization beam splitter coupled to the reflector, and a polarization switch coupled to the polarization beam splitter. A first component group includes a first birefringent material coupled to the first port, a structured half wavelength plate coupled to the first birefringent material, a second birefringent material coupled to the structured half wavelength plate, and a polarization component subgroup. The polarization component subgroup includes a half wavelength plate coupled to a Faraday rotator. The polarization component group is coupled between the second birefringent material and the reflector in the switching component group. A second component group includes a first birefringent material coupled to the second port, a structured half wavelength plate coupled to the first birefringent material, a second birefringent material coupled to the structured half wavelength plate, and a polarization component subgroup. The polarization component group includes a half wavelength plate coupled to a Faraday rotator. The polarization component group is coupled between the second birefringent material and the polarization beam splitter in the switching component group.

In another aspect the invention provides an optical switch. A first port receives an optical input and generates an optical output. A second port receives an optical input and generates an optical output. A switching component group includes a reflector, a polarization beam splitter coupled to the reflector, and a polarization switch coupled to the polarization beam splitter. A first component group is coupled between the first port and the reflector in the switch component group and includes a non-symmetrical device. A second component group is coupled between the second port and the polarization beam splitter in the switch component group and includes a non-symmetrical device. Each of the non-symmetrical devices allows for a traversal of light beams along different paths in a respective component group when the light beams pass round trip through the respective component groups.

In another aspect, the invention provides an optical component. The optical component includes a first birefringent material, a first structured half wavelength plate coupled to the first birefringent material, a second birefringent material coupled to the first structured half wavelength plate, a second half wavelength plate coupled to the second birefringent material, and a Faraday rotator coupled to the second half wavelength plate.

In another aspect, the invention provides an optical component group. The optical component group includes a first birefringent material, a structured half wavelength plate coupled to the first birefringent material, a second birefringent material coupled to the structured half wavelength plate, a Faraday rotator coupled to the second birefringent material, and a half wavelength plate coupled to the Faraday rotator.

Aspects of the invention can include one or more of the following advantages. The present invention provides an easily manufacturable 2×2 optical switch with two optical ports such that an optical signal introduced at one port can be returned to the same optical port or the different optical port. Other advantages will be readily apparent from the attached figures and the description below.

BRIEF DESCRIPTION OF THE DRAWINGS

FIG. 1 illustrates a 2×2 optical switch.

FIG. 2a illustrates the optical path through the switch of FIG. 1 for an optical input introduced at port 1 when the polarization switch is disabled.

FIG. 2b illustrates the optical path through the switch of FIG. 1 for an optical input introduced at port 2 when the polarization switch is disabled.

FIG. 3a illustrates the optical path through the switch of FIG. 1 for an optical input introduced at port 1 when the polarization switch is enabled.

FIG. 3b illustrates the optical path through the switch of FIG. 1 for an optical input introduced at port 2 when the polarization switch is enabled.

FIG. 4 shows one implementation of an optical switch including a filter.

FIG. 5a and FIG. 5b show schematically the optical paths traversed by light introduced at port 100 and port 200 of the optical switch of FIG. 4.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of a 2×2 optical switch having specific components having a specific configuration. Similarly, the present invention will be described in terms of 2×2 optical switch components having specific relationships, such as distances or angles between components. However, one of ordinary skill in the art will readily recognize that this method and system will operate effectively for other components having similar properties, other configurations, and other relationships between components.

Referring now to FIG. 1, a perspective view of one implementation of a 2×2 optical switch 1000 is shown. The 2×2 optical switch 1000 includes two ports, a port 100, and a port 200. The port 100 is coupled to a first fiber (not shown) and is operable to receive and transmit optical signals. The port 200 is coupled to a second fiber (not shown) and is operable to receive and transmit optical signals. The 2×2 optical switch 1000 is configured for two possibilities as determined by a control signal applied to the optical switch: (1) when the control signal is not present, an optical signal received at one port (e.g., port 100) will be transmitted back to the same port (e.g., port 100); and (2) when the control signal is present, an optical signal received at one port (e.g., port 100) will be transmitted to another port (e.g., port 200).

For ease of illustration, the components included in 2×2 optical switch 1000 are divided into three component groups: component group 10 generally relates to port 100, component group 20 generally relates to port 200, and component group 30 generally relates to components for switching between port 100 and port 200.

Component group 10 includes port 100, wedge 110, birefringent material 120, phase compensation material 122, structured Half Wave Plate ("HWP") 130, birefringent material 140, HWP 150, and Faraday rotator 160. Port 100 further includes a collimator (not shown).

Component group 20, is very similar to component group 10, and includes port 200, wedge 210, birefringent material 220, phase compensation material 222, structured HWP 230, birefringent material 240, HWP 250, and Faraday rotator 260. Port 200 further includes a collimator (not shown).

Component group 30 includes reflector 310, Polarization BeamSplitter ("PBS") 320, and polarization switch 300. In one implementation, polarization switch 300 includes a reflection mirror 308 and a liquid crystal cell 305 sandwiched between transparent conductor plates 301 and 302.

A light beam may enter one of four regions of a given component in component group 10 or component group 20. The four regions are labeled as quadrant I, II, III, IV, as shown in FIG. 1. The x and y directions are also shown. The positive z direction is along the propagation direction of a light beam introduced at ports 100 or 200.

FIGS. 2a and 2b illustrate, respectively, the optical path traversed by an optical signal introduced at port 1 and at port 2 when the polarization switch is disabled. FIGS. 3a and 3b illustrate, respectively, the optical path traversed by an optical signal introduced at port 1 and at port 2 when the polarization switch is enabled.

A. Component Group 10

Referring to FIG. 1, component group 10 performs two functions: (1) an input light beam entering port 100 will be split into two light beams with the x-polarization, and exit respectively from quadrants I and II of Faraday rotator 160 in the positive z-direction; (2) two light beams with the x-polarization, entering quadrants I and II of Faraday rotator 160 in the negative z-direction, after passing through component group 10, will be merged and exit from port 100 as one output light beam.

Input light introduced at port 100 is generally deflected in the y-direction by a collimator (not shown). The light beam, after being deflected in the y-direction, is corrected by wedge 110 to be traveling generally in the z-direction. The corrected beam enters quadrant II of birefringent material 120. The polarization of light beams before entering birefringent material 120 is represented by symbol 112 in FIG. 2a.

An optical signal input to a port is typically randomly polarized. The optical signal can be decomposed into two components with the state of polarization (SOP) of each orthogonal to each other and to the propagation direction. The two components are referred to as "o" and "e" rays. Thus, an input optical signal can be decomposed into a first portion having a first polarization and a second portion having a second polarization. Birefringent material 120 is a displacement element that is used to decompose light traveling in a z-direction into first and second portions and to join two portions having first and second polarizations when traveling in the negative z-direction.

Birefringent material 120 is constructed and orientated in such a way that a light beam traveling in the z-direction with the y-polarization will pass through birefringent material 120 undeflected, while a light beam traveling in the z-direction with the x-polarization will be deflected in the x-direction. Accordingly, birefringent material 120 splits or joins light beams in accordance with their respective polarizations as will be discussed below. Light received on the input is assumed to be of random polarization. A light beam with y-polarization received from wedge 110, passes through birefringent material 120 and phase compensation material 122, and enters quadrant II of structured HWP 130. A light beam with the x-polarization received from wedge 110, is deflected in the x-direction by birefringent material 120, and enters quadrant I of structured HWP 130. The polarization of light beams before entering structured HWP 130 is represented by symbol 123 in FIG. 2a.

Structured HWP 130 is designed in such a way that the polarization of a light beam passing through quadrants II or IV of structured HWP 130 will be rotated by 90 degrees, and the polarization of a light beam passing through quadrants I or III of structured HWP 130 will not change. The light beam with the x-polarization received from quadrant I of birefringent material 120, passes through structured HWP 130, and enters quadrant I of birefringent material 140 directly with the x-polarization. The light beam with the y-polarization received from quadrant II of birefringent material 120, passes through structured HWP 130, and enters quadrant II of birefringent material 140 with x-polarization. The polarization of the light beams before entering birefringent material 140 is represented by symbol 134 in FIG. 2a.

Birefringent material 140 is of similar construction to birefringent material 120. Birefringent material 140 is a displacement device constructed in such a way that a light beam with the x-polarization passes through birefringent material 140 undeflected, and a light beam with the y-polarization passing through material 140 is deflected. More specifically, a light beam with the y-polarization traveling in the negative z-direction passing through material 140 gets deflected in the negative y-direction. The two light beams with the x-polarization received from structured HWP 130, pass though birefringent material 140 un-deflected, and enter respectively quadrants I and II of HWP 150. The polarization of the light beams before entering HWP 150 is represented by symbol 145 in FIG. 2a.

HWP 150 is constructed in such a way that the polarization of a light beam traveling in the z-direction will be rotated −45 degrees with respect to the positive z-axis, and a light beam traveling in the negative z-direction will be rotated +45 degrees with respect to the positive z-axis. The two light beams received from birefringent material 140, after passing through respectively quadrants I and II of HWP 150, change from the x-polarization to the x−y polarization, and enter respectively quadrant I and quadrant II of Faraday rotator 160. The polarization of the light beams before entering Faraday rotator 160 is represented by symbol 156 in FIG. 2a.

Faraday rotator 160 is constructed in such a way that the polarization of a light beam traveling in the z-direction will be rotated +45 degrees with respect to the positive z-axis, and a light beam traveling in the negative z-direction will be rotated +45 degrees with respect to the positive z-axis. The two light beams received from HWP 150, after passing through respectively quadrants I and II of Faraday rotator 160, change from the x−y polarization to the x-polarization, and enter respectively quadrants I and II of reflector 310. The polarization of the light beams before entering reflector 310 is represented by symbol 167 in FIG. 2a.

Light received at port 100, after passing through all components in component group 10, is split into two light beams. The two light beams exist respectively quadrants I and II of Faraday rotator 160.

HWP 150 is a reciprocal device. The polarization of a light beam passing round trip (i.e., passing in the positive z-direction through HWP 150, then reflected by a mirror, and passing back through HWP 150 again in the negative z-direction) through HWP 150 is unchanged. Faraday rotator 160 is a non-reciprocal device. The polarization of a light beam passing round trip (i.e., a light beam passing in the positive z-direction through Faraday rotator 160, then reflected by a mirror, and passing back through Faraday rotator 160 again in the negative z-direction) through Faraday rotator 160 is changed (e.g., rotated by a total of 90 degrees).

Because component group 10 includes a non-reciprocal device, Faraday rotator 160, the two light beams exiting Faraday rotator 160 in the z-direction, when being reflected back into Faraday rotator 160 by a mirror, follow optical paths in the negative z-direction different from the optical paths traversed in the z-direction. For example, the two light beams traveling in the negative z-direction entering Faraday rotator 160 will eventually be merged and exit port 110 as an output light beam, after passing through all components in component group 10. More specifically, two light beams with the x-polarization, after passing through respectively quadrants I and II of Faraday rotator 160 in the negative z-direction, become two light beams with the x+y polarization. The polarization of the light beams before entering Faraday rotator 160 is represented by symbol 176 in FIG. 2a. The two light beams enter respectively quadrants I and II of HWP 150. The polarization of light beams before entering the HWP 150 is represented by symbol 165 in FIG. 2a.

The two light beams with the x+y polarization that pass through respectively quadrants I and II of HWP 150 in the negative z-direction, yield two light beams with the y-polarization. The two light beams with the y-polarization enter respectively quadrants I and II of birefringent material 140. The polarization of the light beams before entering birefringent material 140 is represented by symbol 154 in FIG. 2a.

The two light beams with y-polarization, traveling in the negative z-direction, after passing through birefringent material 140, are deflected in the negative y-direction, and enter respectively quadrants III and IV of structured HWP 130. The polarization of the light beams before entering structured HWP 130 is represented by symbol 143 in FIG. 2a.

One light beam, after passing through quadrant III of structured HWP 130, enters quadrant III of birefringent material 140 with y-polarization. Another light beam, after passing through quadrant IV of structured HWP 130, enters quadrant IV of birefringent material 120 with x-polarization. The polarization of the light beams before entering birefringent material 120 is represented by symbol 132 in FIG. 2a.

The light beam with the y-polarization, after passing through phase compensator 122, exits quadrant III of birefringent material 120 with y-polarization. The light beam with the x-polarization, entering quadrant IV of birefringent material 120, is deflected in the negative x-direction by birefringent material 120, and is merged with light beams having the y-polarization in quadrant III of birefringent material 120. The two beams merge at quadrant III of birefringent material 120, are deflected together by wedge 110 (FIG. 1), enter one end of port 100 (FIG. 1), and exit from another end of port 100 as an output light beam.

B. Component Group 20

Referring to FIG. 1, like component group 10, component group 20 also performs two functions: (1) an input light beam entering port 200 will be split into two light beams with the y-polarization, and exit respectively in the z-direction from quadrants I and II of Faraday rotator 260; (2) two light beams with the y-polarization, entering quadrants I and II of Faraday rotator 260 in the negative z-direction, after passing through component group 20, will be merged and exit from port 200 as one output light beam.

With the exception of Faraday rotators 260 and 160, the function of each component in component group 20 is similar to the function of the corresponding component in component group 10. More specifically, wedge 210 can be constructed similar to wedge 110, birefringent material 220 similar to birefringent material 120, phase compensation plate 222 similar to phase compensation plate 122, structured HWP 230 similar to structured HWP 130, birefringent material 240 similar to birefringent material 140, and HWP 250 similar to HWP 150.

Because of these similarities, the path in component group 20 traversed by a light beam introduced at port 200 is similar to the path in component group 10 traversed by a light beam introduced at port 100.

Referring to FIG. 2b, an input light beam introduced at port 200 is split into two light beams before entering Faraday rotator 260. The two light beams exist respectively quadrants I and II of the HWP 250 in the positive z-direction with the x–y polarization, and enter respectively quadrants I and II of Faraday rotator 260.

The polarization of the light beams in component group is represented by symbol 212 before entering birefringent material 220, by symbol 223 before entering structured HWP 230, by symbol 234 before entering birefringent material 240, by symbol 245 before entering HWP 250, and by symbol 256 before entering Faraday rotator 260.

Referring to FIG. 1, the Faraday rotators 260 and 160 differ in the direction that the polarization of light changes (i.e., rotates) when light passes through each. Faraday rotator 260 is constructed in such a way that the polarization of a light beam traveling in the positive z-direction will be rotated +45 degrees with respect to the positive z-axis, and a light beam traveling in the negative z-direction will be rotated +45 degrees with respect to the positive z-axis. In contrast, Faraday rotator 160 is constructed in such a way that the polarization of a light beam traveling in the z-direction will be rotated −45 degrees with respect to the positive z-axis, and a light beam traveling in the negative z-direction will be rotated −45 degrees with respect to the positive z-axis.

Referring to FIG. 2b, the polarizations of the two light beams passing through respectively quadrants I and II of Faraday rotator 260 in the positive z-direction changes from the x–y polarization to the y-polarization. The polarization of the light beams before entering Faraday rotator 260 is represented by symbol 276 in FIG. 2b. After passing through Faraday rotator 260, the light beams with y-polarization are incident upon respectively quadrants I and II of polarization beam splitter 320.

When traveling in the reverse direction, the two light beams with the y-polarization, from polarization beam splitter 320, enter quadrants I and II of Faraday rotator 260 in the negative z-direction. The two light beams with y-polarization, after passing through respectively quadrants I and II of Faraday rotator 260 in the negative z-direction, produce two light beams with x+y polarization. The two light beams with the x+y polarization enter respectively quadrants I and II of HWP 250. The polarization of the light beams in component group 20 before entering HWP 250 is represented by symbol 265 in FIG. 2b.

The two light beams entering respectively quadrants I and II of HWP 250 with x+y polarization, after passing though all the rest of the components in component group 20, enter one end of port 200, and exit from another end of port 200 as an output light beam.

Referring to FIG. 2b, the polarization of the light beams in component group 20 is represented by symbol 254 before entering birefringent material 240, by symbol 243 before entering HWP 230, by symbol 232 before entering birefringent material 220, and by symbol 221 before entering wedge 210.

C. Component Group 30

Referring to FIG. 1, component group 30 includes reflector 310, Polarization BeamSplitter ("PBS") 320, and polarization switch 300.

Reflector 310 is constructed in such a way that a light beam traveling in the z-direction will be reflected in the negative y-direction, and a light beam traveling in y-direction will be reflected in the negative z-direction.

PBS 320 is constructed in such a way that a light beam incident upon PBS 320 with the x-polarization will be deflected, and a light beam with the y-polarization will pass through PBS 320 without deflection. More specifically, a light beam with the x-polarization incident upon PBS 320 in the negative y-direction will be deflected in the z-direction, and a light beam with the x-polarization and incident upon PBS 320 in the negative z-direction will be deflected in the y-direction. A light beam with the y-polarization incident upon PBS 320 in either the positive or negative z-direction passes through without deflection.

Polarization switch 300 includes reflection mirror 308 and liquid crystal cell 305 sandwiched between transparent conductor plates 301 and 302. A bias voltage can be applied between the two transparent conductor plates 301 and 302. In one implementation, when a zero bias voltage is applied to the two conductor plates 301 and 302, polarization switch 300 is disabled. A light beam, traveling in the z-direction, passes through conductor plate 301, liquid crystal cell 305, and conductor plate 302, and maintains the same polarization. The light beam, after being reflected by mirror 308, traveling in the negative z-direction, passes back through conductor plate 302, liquid crystal cell 305, and conductor plate 301, and maintains the same polarization. Thus, when polarization switch 300 is disabled, a light beam will maintain the same polarization after being reflected by the polarization switch 300.

In one implementation, when a bias voltage Vb is applied to the two conductor plates 301 and 302, polarization switch 300 is enabled. A light beam, traveling in the z-direction, passes through conductor plate 301, liquid crystal cell 305, and conductor plate 302. The polarization of the light beam changes by 45 degrees. The light beam, after being reflected by mirror 308, traveling in the negative z-direction, passes back through conductor plate 302, liquid crystal cell 305, and conductor plate 301. The polarization of the light beam after reflection changes again by another 45 degrees. Thus, when polarization switch 300 is enabled, the polarization switch 300 rotates the polarization of a light beam reflected thereby a total of 90 degrees.

In one implementation, polarization switch 300 is constructed using a liquid crystal cell. Alternatively, polarization switch 300 may be constructed using a Faraday rotator controlled by a magnetic filed. Other methods of constructing polarization switch 300 are also possible.

Component group 30 supports four functions. When polarization switch 300 is disabled, two light beams with the x-polarization, exiting respectively from quadrants I and II of Faraday rotator 160, will be reflected and enter quadrants I and II of Faraday rotator 160 in the negative z-direction with the x-polarization. When polarization switch 300 is disabled, two light beams with y-polarization, exiting respectively from quadrants I and II of Faraday rotator 260, will be reflected and enter quadrants I and II of Faraday rotator 260 in the negative z-direction with y-polarization. When polarization switch 300 is enabled, two light beams with the x-polarization, exiting respectively from quadrants I and II of Faraday rotator 160, will be reflected and enter quadrants I and II of Faraday rotator 260 in the negative z-direction with y-polarization. Finally, when polarization switch 300 is enabled, two light beams with y-polarization, exiting respectively from quadrants I and II of Faraday rotator 260, are reflected and enter quadrants I and II of Faraday rotator 160 in the negative z-direction with the x-polarization.

The first function of component group 30 is illustrated in FIG. 2a. In FIG. 2a, polarization switch 300 is disabled. Two light beams with the x-polarization, exiting respectively from quadrants I and II of Faraday rotator 160, are reflected by reflector 310 to PBS 320. The two light beams incident upon PBS 320 with the x-polarization are deflected in the z-direction and enter polarization switch 300. Since polarization switch 300 is disabled, the two light beams with the x-polarization are reflected back by polarization switch 300 to PBS 320 with the same polarization. These two light beams, traveling in the negative z-direction with the x-polarization, are deflected by PBS 320 to reflector 310 in the y-direction. After being reflected again by reflector 310, the two light beams enter quadrants I and II of Faraday rotator 160 in the negative z-direction with the x-polarization.

The second function of component group 30 is illustrated in FIG. 2b. In FIG. 2b, polarization switch 300 is disabled. Two light beams with the y-polarization, exiting respectively from quadrants I and II of Faraday rotator 260, are incident upon PBS 320. The two light beams with the y-polarization pass through PBS 320, and enter polarization switch 300. Since polarization switch 300 is disabled, the two light beams with the y-polarization are reflected back by polarization switch 300 to PBS 320 with the same polarization. The two light beams traveling in the negative z-direction with the y-polarization, pass through PBS 320, and enter quadrants I and II of Faraday rotator 260 in the negative z-direction with the y-polarization.

The third function of component group 30 is illustrated in FIG. 3a. In FIG. 3a, polarization switch 300 is enabled. Two light beams with the x-polarization, exiting respectively from quadrants I and II of Faraday rotator 160, are reflected by reflector 310 to PBS 320. The two light beams incident upon PBS 320 with the x-polarization are deflected in the z-direction and enter polarization switch 300. Since polarization switch 300 is enabled, the two light beams with the x-polarization are reflected back by polarization switch 300 to PBS 320 with the y-polarization. The two light beams traveling in the negative z-direction with y-polarization, pass through PBS 320, and enter quadrants I and II of Faraday rotator 260 in the negative z-direction with y-polarization.

The fourth function of component group 30 is illustrated in FIG. 3b. In FIG. 3b, polarization switch 300 is enabled. Two light beams with y-polarization (267), exiting respectively from quadrants I and II of Faraday rotator 260, are incident upon PBS 320. The two light beams with the y-polarization pass through PBS 320, and enter polarization switch 300. Since polarization switch 300 is enabled, the two light beams with the y-polarization are reflected back by polarization switch 300 to PBS 320 with the x-polarization. The two light beams, traveling in the negative z-direction with the x-polarization, are deflected by PBS 320 to reflector 310 in the y-direction. After being reflected again by reflector 310, the two light beams enter quadrants I and II of Faraday rotator 160 in the negative z-direction with the x-polarization (176).

A 2×2 optical switch can be constructed by combining three the component groups 10, 20, and 30. In a first operational scenario where polarization switch 300 is disabled, an input light beam I1 entering port 100 will be returned as an output light beam O1 from port 100, while an input light beam I2 entering port 200 will be returned as an output light beam O2 from port 200. In a second operational scenario where the polarization switch 300 is enabled, an input light beam I1 entering port 100 will be returned as an output light beam O1 from port 200, while an input light beam I2 entering port 200 will be returned as an output light beam O2 from port 100.

The 2×2 optical switch of FIG. 1 can be modified to add and drop selected wavelengths in a given optical path. Referring now to FIG. 4, the polarization switch 300 includes filter 306 placed in front of conductor plate 301. Filter 306 can be constructed in such a way that a light beam with wavelength λ will be reflected, and a light beam with wavelength λ' will be transmitted. The polarization switch 300 in FIG. 4 only switches the polarization of a light beam with wavelength λ'. When polarization switch 300 is disabled, a light beam with any wavelength will maintain the same polarization after being reflected by the polarization switch 300. When polarization switch 300 is enabled, a light beam with wavelength λ will maintain the same polarization and a light beam with wavelength λ' will be rotated by 90 degrees, after being reflected by the polarization switch 300.

FIGS. 5a and 5b show schematically the optical paths traversed by light introduced at port 100 and port 200. As shown in FIG. 5a, when polarization switch 300 is disabled, the light received at the input I1 of port 100 with wavelengths λ and λ' are both transmitted to the output O1 of port 100, and the light received at the input I2 of port 200 with wavelengths λ and λ' are both transmitted to the output O2 of port 200. As shown in FIG. 5b, when polarization switch 300 is enabled, the light received at the input I1 of port 100 with wavelength λ is transmitted to the output O1 of port 100 while the light received at port 100 with wavelength λ' is transmitted to the output O2 of port 200. Similarly, the light received at the input I2 of port 200 with wavelength λ is transmitted to the output O2 of port 200 while the light received at the input I2 of port 200 with wavelength λ' is transmitted to the output O1 of port 100.

When polarization switch 300 of FIG. 4 is enabled, the light received at the input I1 of port 100 with wavelength λ is transmitted to the output O1 of port 100. The light received at the input I1 of port 100 with wavelength λ' is dropped, and the light received at the input I2 of port 200 with wavelength λ' is added and transmitted to the output O1 of port 100.

Filter 306 can be a tunable filter, such as a piezoelectric controlled Fabry-Perot filter, and the wavelength being added and dropped in the optical switch can be controlled by an external variable. Filter 306 can also be constructed to transmit a number of wavelengths or a band of wavelengths, and multiple wavelengths can be added and dropped in the optical switch.

A method and system has been disclosed for providing a 2×2 optical switch, which may have low cost to manufacture. Although the present invention has been described in accordance with the embodiments shown, one of ordinary skill in the art will readily recognize that there could be variations to the embodiments and those variations would be within the spirit and scope of the present invention. For example, the position of HWP 150 and Faraday rotator 160 can be exchanged. The position of HWP 250 and Faraday rotator 260 can be exchanged. Wedge 110 can be inserted between birefringent material 120 and structured HWP 130. Wedge 210 can be inserted between birefringent material 220 and structured HWP 230. Wedge 110 and 210 can be replaced with half-wedges. The mirror 308 can be implemented to have certain wavelength selectivity, thus enabling the 2×2 optical switch to switch optical signals based on their respective optical wavelengths. Accordingly, many modifications may be made by one of ordinary skill in the art without departing from the spirit and scope of the appended claims.

What is claimed is:

1. A 2×2 optical switch comprising:
a first port adapted to receive an optical input and generate an optical output;
a second port adapted to receive an optical input and generate an optical output;
a switching component group including a singular polarization switch;
a first component group coupled between the first port and the switching component group;
a second component group coupled between the second port and the switching component group;
wherein,
when the singular polarization switch is disabled, the switching component group being adapted
to pass each light beam exiting from the first component group, each exiting light beam having a first chosen polarization, and reintroduce to the first component group the light beams without changing the polarization of the light beams, and
to pass each light beam exiting from the second component group, each exiting light beam having a second chosen polarization, and reintroduce to the second component group the light beams without changing the polarization of the light beams, and
when the singular polarization switch is enabled, the switching component group being adapted
to convert light beams exiting from the first component group with the first chosen polarization into light beams entering the second component group with the second chosen polarization, and
to convert light beams exiting from the second component group with the second chosen polarization into light beams entering the first component group with the first chosen polarization.

2. The 2×2 optical switch of claim 1, wherein
the first component group is adapted to receive the optical input from the first port and generate two light beams with the first chosen polarization entering the switching component group, and to receive two light beams with the first chosen polarization from the switching component group and generate an optical output to the first port; and
the second component group is adapted to receive the optical input from the second port and generate two light beams with the second chosen polarization entering the switching component group, and to receive two light beams with the second chosen polarization from the switching component group and generate an optical output to the second port.

3. The 2×2 optical switch of claim 1, wherein the singular polarization switch includes a mirror.

4. The 2×2 optical switch of claim 1, wherein the singular polarization switch includes a liquid crystal cell sandwiched between two transparent conducting plates.

5. The 2×2 optical switch of claim 1, wherein the singular polarization switch includes a Faraday rotator modulated by a magnetic field.

6. The 2×2 optical switch of claim 1, wherein the first component group comprises:
a first birefringent material;
a structured half wavelength plate coupled to the first birefringent material;
a second birefringent material coupled to the structured half wavelength plate;
a half wavelength plate coupled to the second birefringent material; and
a Faraday rotator coupled to the half wavelength plate.

7. The 2×2 optical switch of claim 1, wherein the first component group comprises:
a first birefringent material;
a structured half wavelength plate coupled to the first birefringent material;
a second birefringent material coupled to the structured half wavelength plate;
a Faraday rotator coupled to the second birefringent material; and
a half wavelength plate coupled to the Faraday rotator.

8. The 2×2 optical switch of claim 1, wherein the switching component group comprises,
a reflector;
a singular polarization switch; and
a polarization beam splitter coupled between the reflector and the singular polarization switch.

9. An optical switch comprising:
a first port adapted to receive an optical input and generate an optical output;
a second port adapted to receive an optical input and generate an optical output;
a switching component group including:
a reflector;
a polarization beam splitter coupled to the reflector; and
a singular polarization switch coupled to the polarization beam splitter;
a first component group coupled between the first port and the reflector in the switching component group, the first component group operable to provide light beams, each light beam having a first polarization, to the switching component group; and
a second component group coupled between the second port and the polarization beam splitter in the switching component group, the second component group operable to provide light beams, each light beam having a second polarization, to the switching component group.

10. The optical switch of claim 9, wherein
the first component group is adapted to receive the optical input from the first port and generate one or more light beams with a first chosen polarization entering the reflector in the switching component group, and to receive one or more light beams with the first chosen polarization from the reflector in the switching component group and generate an optical output to the first port; and
the second component group is adapted to receive the optical input from the second port and generate one or more light beams with a second chosen polarization entering the polarization beam splitter in the switching component group, and to receive one or more light beams with the second chosen polarization from the polarization beam splitter in the switching component group and generate an optical output to the second port.

11. The optical switch of claim 9, wherein the singular polarization switch includes a mirror.

12. The optical switch of claim 9, wherein the singular polarization switch includes a liquid crystal cell sandwiched between two transparent conducting plates.

13. The optical switch of claim 9, wherein the singular polarization switch includes a Faraday rotator modulated by a magnetic field.

14. The optical switch of claim 9, wherein the singular polarization switch includes an optical filter.

15. The optical switch of claim 14, wherein the optical filter is a tunable optical filter.

16. The optical switch of claim 9, wherein the first component group comprises:
a first birefringent material;
a structured half wavelength plate coupled to the first birefringent material;
a second birefringent material coupled to the structured half wavelength plate;
a half wavelength plate coupled to the second birefringent material; and
a Faraday rotator coupled to the half wavelength plate.

17. The optical switch of claim 9, wherein the first component group comprises:
a first birefringent material;
a structured half wavelength plate coupled to the first birefringent material;
a second birefringent material coupled to the structured half wavelength plate;
a Faraday rotator coupled to the second birefringent material; and
a half wavelength plate coupled to the Faraday rotator.

18. The optical switch of claim 9, wherein the second component group comprises:
a first birefringent material;
a structured half wavelength plate coupled to the first birefringent material;
a second birefringent material coupled to the structured half wavelength plate;
a half wavelength plate coupled to the second birefringent material; and
a Faraday rotator coupled to the half wavelength plate.

19. The optical switch of claim 9, wherein the second component group comprises:
a first birefringent material;
a structured half wavelength plate coupled to the first birefringent material;
a second birefringent material coupled to the structured half wavelength plate;
a Faraday rotator coupled to the second birefringent material; and
a half wavelength plate coupled to the Faraday rotator.

20. The optical switch of claim 9, where the polarization beam splitter of the switching component group is coupled between the reflector and the singular polarization switch.

21. The optical switch of claim 9, where the singular polarization switch further comprises:
a reflection mirror;
a switch component including a cell positioned between a fist and a second conducting plate, the switch component operable to rotate a polarization of a light beam when enabled and to pass a light beam without rotation when disabled.

22. An optical switch comprising:
a first port adapted to receive an optical input and generate an optical output;
a second port adapted to receive an optical input and generate an optical output;
a switching component group including:
a reflector;
a polarization beam splitter coupled to the reflector; and
a singular polarization switch coupled to the polarization beam splitter;
a first component group including:
a first birefringent material coupled to the first port;
a structured half wavelength plate coupled to the first birefringent material, the structured half wavelength plate being operable to rotate a polarization of light passing through a first portion of the structured half wavelength plate while the polarization of light passing through a second portion of the structured half wavelength plate remains substantially unchanged;
a second birefringent material coupled to the structured half wavelength plate; and
a polarization component subgroup including a coupled half wavelength plate and a Faraday rotator, the polarization component group coupled between the second birefringent material and the reflector in the switching component group; and
a second component group including:
a first birefringent material coupled to the second port;
a structured half wavelength plate coupled to the first birefringent material;
a second birefringent material coupled to the structured half wavelength plate; and
a polarization component subgroup including a coupled half wavelength plate and a Faraday rotator, the polarization component group coupled between the second birefringent material and the polarization beam splitter in the switching component group.

23. An optical switch comprising:
a first port adapted to receive an optical input and generate an optical output;
a second port adapted to receive an optical input and generate an optical output;
a switching component group including:
a reflector;
a polarization beam splitter coupled to the reflector; and
a singular polarization switch coupled to the polarization beam splitter;
a first component group coupled between the first port and the reflector in the switching component group and including a non-symmetrical device, the first component group adapted to provide an optical output having a first polarization to the switching component group; and
a second component group coupled between the second port and the polarization beam splitter in the switching component group and including a non-symmetrical device, the second component group adapted to provide a optical output having a second polarization to the switching component group, wherein each of the non-symmetrical devices allows for a traversal of light beams along different paths in a respective component group when the light beams pass round trip through the respective component groups.

24. The optical switch of claim 23, where the polarization beam splitter of the switching component group is coupled between the reflector and the singular polarization switch.

* * * * *